March 27, 1928. 1,664,254
L. JOHNSON
ATTACHMENT FOR LISTER CULTIVATORS
Filed April 26, 1927
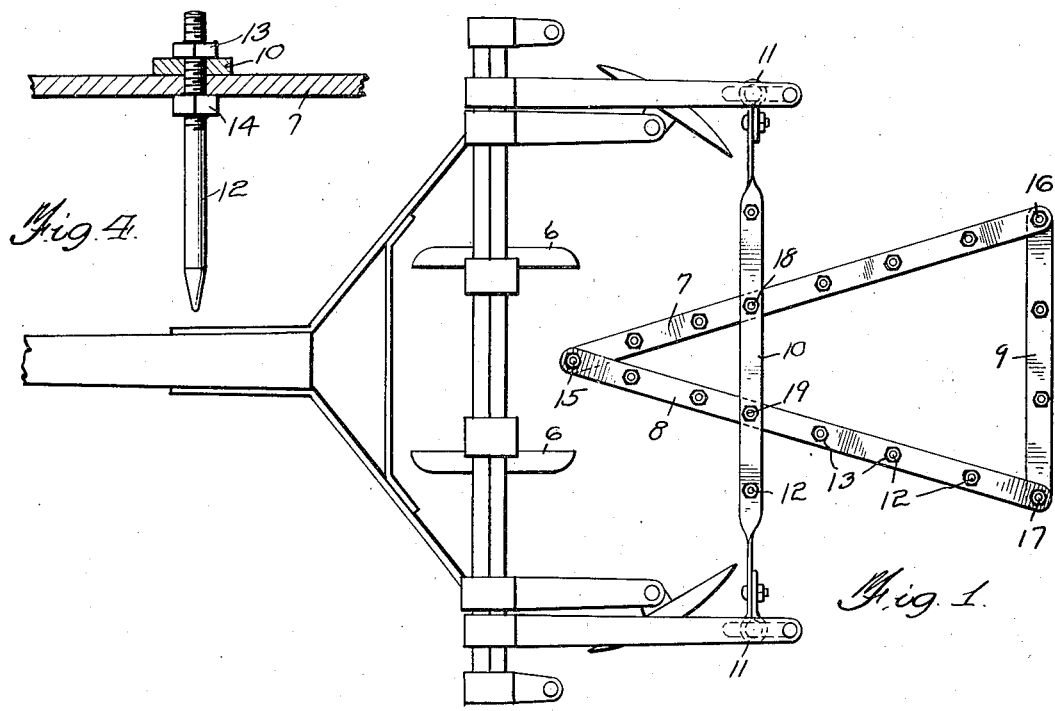
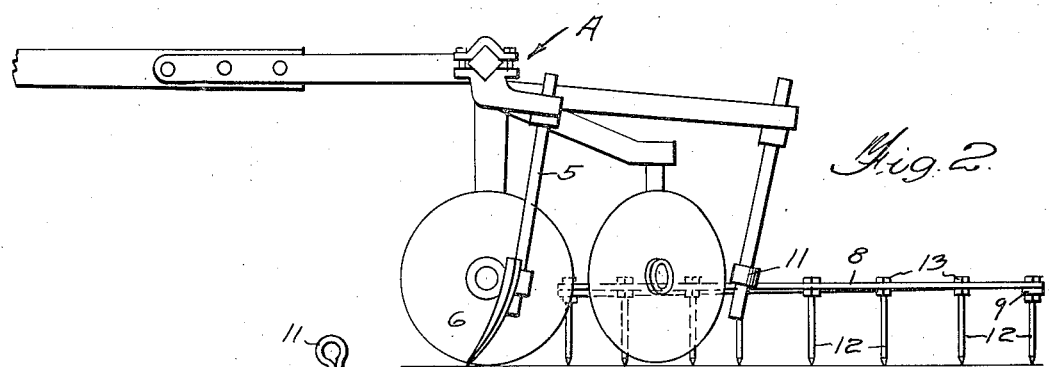
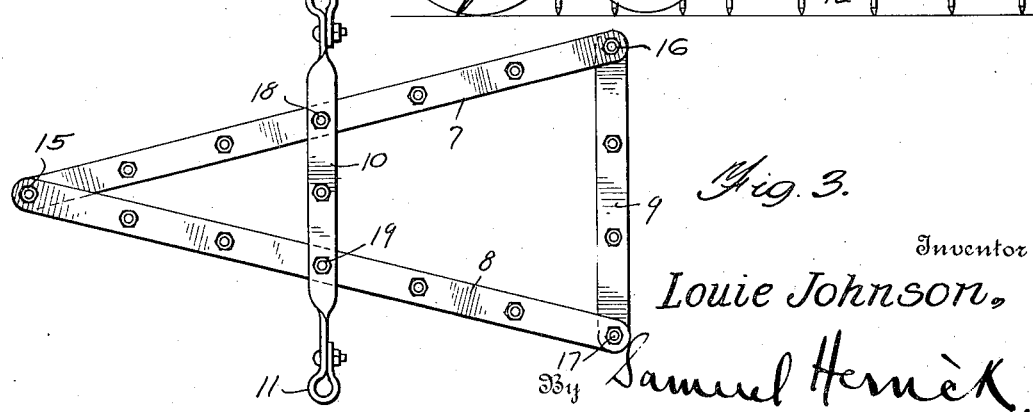
Inventor
Louie Johnson,
By Samuel Hernik,
Attorney Patented Mar. 27, 1928.

1,664,254

UNITED STATES PATENT OFFICE.

LOUIE JOHNSON, OF PRESHO, SOUTH DAKOTA.

ATTACHMENT FOR LISTER CULTIVATORS.

Application filed April 26, 1927. Serial No. 186,689.

This invention relates to an attachment for lister cultivators and it has for its object to provide a simple and inexpensive device adapted to be attached to the shanks of a lister cultivator, after the shovels of the latter have been removed, the device lying in such position that it will travel in the bottom of the furrow.

The device is of particular utility for cultivating listed corn the first time, or it may be used for other purposes if desired.

I find in practice that it will do as good or better work than the shovels, that it is easier to set to regulate the depth of cultivation, than with shovels; that it is very efficient in getting rid of cutworms and that it loosens the soil and leaves a fine dust mulch which promotes the growth of the corn.

In the accompanying drawings:

Fig. 1 is a plan view of a portion of a lister cultivator having the attachment applied thereto.

Fig. 2 is a side elevation of the cultivator.

Fig. 3 is a plan view of the device of the present invention, and

Fig. 4 is a sectional view illustrating the manner of attaching the teeth of the cultivator attachment to the frame members thereof.

Like numerals designate corresponding parts in all of the figures of the drawing.

Referring to the drawing, A designates, in a general way, a well known and conventional type of lister cultivator. These cultivators comprise substantially vertically arranged shanks 5, which, usually, carry shovels 6. In using my attachment I remove the shovels from the rear shanks of the lister cultivator and substiutute my attachment. This attachment is made up of bars 7, 8 and 9 to form a substantially tri-angular frame. This frame is spanned by a cross bar 10 which, at its outer end, is provided with eyes 11. These eyes are engaged with the shanks of the cultivator, in the manner shown, after the shovels have been removed. Cultivator teeth 12 in any desired number are carried by the frame of the attachment. These teeth may be attached to the frame members in any desired manner. In the particular embodiment shown, said teeth are threaded for the reception of upper and lower nuts 13 and 14 (see Fig. 4), which bind the teeth in place. In addition, these teeth serve as the connecting members between the bars at the points 15, 16 and 17 and they serve to tie the cross bar 10 to the bars 7 and 8 at the points 18 and 19.

It is to be understood that the invention is not limited to the precise construction set forth but that it includes within its purview whatever changes fairly come within either the terms or the spirit of the appended claims.

Having described my invention what I claim is:

1. An attachment of the character described comprising an elongated substantially tri-angular frame, carrying a plurality of downwardly extending teeth, a cross bar spanning said tri-angular frame and eyes at the outer ends of said cross bar of a shape and dimension to engage the shanks of a lister cultivator, after the shovels of the latter have been removed.

2. An attachment of the character described comprising a tri-angular frame made up of a plurality of substantially flat bars and teeth having pointed lower ends and threaded upper ends and nuts for engaging said teeth above and below the bars, said nuts serving to hold the bars and teeth in engagement with each other and serving to bind the several bars together, a transverse flat bar traversed by some of said teeth and secured by said teeth to the tri-angular frame and eyes at the outer ends of said cross bar of a shape and dimension to engage the shanks of a lister cultivator, after the shovels of the latter have been removed.

3. An attachment of the character described, comprising a triangular frame consisting or two relatively long side bars connected together at the forward end of the frame, and a relatively short rear bar extending between the rear ends of the side bars, a transverse bar extending across the frame and attached thereto, having eyes at the outer ends thereof, which lie wholly outside of said frame and in a plane to adapt them to engage the shanks of a lister cultivator, after the shovels of the latter have been removed, and harrow teeth projecting from the under side of all of the bars of the triangular frame and from the under side of said transverse bar.

In testimony whereof he affixes his signature.

LOUIE JOHNSON.